(12) United States Patent
Hidaka et al.

(10) Patent No.: US 11,988,543 B2
(45) Date of Patent: May 21, 2024

(54) ABNORMALITY DETECTION METHOD FOR FLOW RATE CONTROL DEVICE, AND FLOW RATE MONITORING METHOD

(71) Applicant: FUJIKIN INCORPORATED, Osaka (JP)

(72) Inventors: Atsushi Hidaka, Osaka (JP); Masaaki Nagase, Osaka (JP); Kouji Nishino, Osaka (JP); Nobukazu Ikeda, Osaka (JP); Kaoru Hirata, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 162 days.

(21) Appl. No.: 17/755,966

(22) PCT Filed: Nov. 26, 2020

(86) PCT No.: PCT/JP2020/044049
§ 371 (c)(1),
(2) Date: May 12, 2022

(87) PCT Pub. No.: WO2021/111979
PCT Pub. Date: Jun. 10, 2021

(65) Prior Publication Data
US 2022/0390269 A1    Dec. 8, 2022

(30) Foreign Application Priority Data
Dec. 6, 2019    (JP) .................. 2019-220976

(51) Int. Cl.
*G01F 25/10*    (2022.01)
*G01F 1/36*    (2006.01)
*G05D 7/06*    (2006.01)

(52) U.S. Cl.
CPC .............. *G01F 25/15* (2022.01); *G01F 1/36* (2013.01); *G05D 7/0635* (2013.01)

(58) Field of Classification Search
None
See application file for complete search history.

(56) References Cited

U.S. PATENT DOCUMENTS 9,632,511 B2 * 4/2017 Hirata ..................... G01F 1/363
2002/0174898 A1 * 11/2002 Lowery ............... G05D 7/0635
137/487.5

(Continued)

FOREIGN PATENT DOCUMENTS

JP    3546153 B2    7/2004
JP    4308356 B2    8/2009

(Continued)

OTHER PUBLICATIONS

International Search Report issued in PCT/JP2020/044049; mailed Jan. 26, 2021.

*Primary Examiner* — Daniel S Larkin
(74) *Attorney, Agent, or Firm* — Studebaker & Brackett PC

(57) ABSTRACT

An abnormality detection method is performed in a gas supply system including a flow rate control device having a restriction part, a control valve, a flow rate control pressure sensor for measuring upstream pressure, and a control circuit. The inflow pressure sensor measures the supply pressure. An upstream on/off valve is provided upstream of the inflow pressure sensor. The method includes closing the upstream on/off valve when the gas flows at a controlled flow rate at the downstream of the restriction part by controlling an opening degree of the control valve based on the output of the flow rate control pressure sensor; measuring a drop in supply pressure on the upstream side of the control valve after closing the upstream on/off valve while keeping the control valve open; and detecting the presence (Continued)

or absence of abnormality in the flow rate control device based on the measured supply pressure drop.

16 Claims, 7 Drawing Sheets

(56) References Cited

U.S. PATENT DOCUMENTS

| | | | |
|---|---|---|---|
| 2018/0071702 A1 | 3/2018 | Hidaka et al. | |
| 2018/0283914 A1* | 10/2018 | Sugita | G01F 1/50 |
| 2019/0094847 A1 | 3/2019 | Nagase et al. | |

FOREIGN PATENT DOCUMENTS

| | | |
|---|---|---|
| WO | 2016/174832 A1 | 11/2016 |
| WO | 2017/170174 A1 | 10/2017 |

* cited by examiner

ABNORMALITY DETECTION METHOD FOR FLOW RATE CONTROL DEVICE, AND FLOW RATE MONITORING METHOD

TECHNICAL FIELD

The present invention relates to a method for detecting an abnormality of a flow rate control device provided in a gas supply system used in a semiconductor manufacturing apparatus, a chemical plant, a chemical industrial facility, or the like, and a flow rate monitoring method using the same.

BACKGROUND OF INVENTION

In a semiconductor manufacturing facility, a chemical plant, or the like, it is required to supply a raw material gas or an etching gas to a process chamber at an appropriate flow rate. As a control device of the gas flow rate, a mass flow controller (thermal mass flow controller) and a pressure type flow rate control device are known.

Pressure type flow rate control devices are widely used because they can control the mass flow rate of various fluids with high accuracy by a relatively simple mechanism combining a control valve and the restriction part (e.g., orifice plate or critical nozzle). In particular, the pressure type flow rate control device has an excellent flow control characteristic in that a stable flow control can be performed even if the supply pressure of the primary side fluctuates greatly.

In some pressure type flow rate control devices, the fluid pressure upstream of the restriction part (hereinafter, sometimes referred to as an upstream pressure P1) is controlled to adjust the flow rate. The upstream pressure P1 is controlled by adjusting an opening degree of the control valve disposed in the flow path upstream of the restriction part.

As a control valve, a piezoelectric element driven valve configured to open and close the diaphragm valve element by a piezo actuator can be used. The piezoelectric element driven valve has a high response and is possible to appropriately control the upstream pressure P1 and the flow rate of the gas flowing through the restriction part by feedback controlling its opening degree based on the output of the pressure sensor for measuring the upstream pressure P1.

PRIOR-ART DOCUMENT

Patent Literature

Patent Document 1: Japanese Patent No. 3546153
Patent Document 2: International Publication No. WO 2017/170174
Patent Document 3: Japanese Patent No. 4308356
Patent Document 4: International Publication No. WO 2016/174832

SUMMARY OF INVENTION

Problems to be Solved by Invention

In the pressure type flow rate control device, due to long-term use for example, an abnormality such as corrosion or clogging may occur in the restriction part. When an abnormality occurs in the restriction part, the relationship between the upstream pressure P1 and the flow rate changes, so that the flow rate changes from the normal state even if the upstream pressure P1 is the same. However, since the pressure type flow controller, unlike the thermal mass flow controller, is not provided with a means for directly measuring the flow rate, it is not easy to detect a change in the flow rate caused by the abnormality of the restriction part. Therefore, in the conventional pressure type flow rate control device, a self-diagnosis process is performed for detecting an abnormality in the restriction part.

Patent Document 1 discloses a technique of detecting an abnormality in the restriction part by measuring a drop in the upstream pressure P1 or a pressure drop curve after the control valve is closed. When clogging occurs in the restriction part, the fluid is more difficult to pass through the restriction part, so the time required for lowering the upstream pressure P1 after closing the control valve is longer than normal. Further, when the aperture is enlarged due to corrosion or the like occurs in the restriction part, since the fluid easily passes through the restriction part, the time required for lowering the upstream pressure P1 is shorter than the normal. Therefore, by comparing the pressure drop curve at the time of measurement and the pressure drop curve at the time of normal, while connecting the flow rate control device to the gas supply line, it is possible to detect an abnormality occurring in the restriction part.

Patent Document 2 discloses that the self-diagnosis is performed based on the measurement of the drop of the upstream pressure P1 after the shutoff valve on the downstream side of the restriction part as well as the control valve are closed. The self-diagnosis is performed only within a period in which the upstream pressure P1 is sufficiently larger than the pressure on the downstream side of the restriction part (i.e., a downstream pressure P2), that is, within a period in which a so-called critical expansion condition is satisfied.

Furthermore, Patent Document 2 discloses the detection method of the abnormality in the restriction part, by comparing the slope of the approximate line obtained from the plot of ln(P1/Pi) with respect to time (where Pi is the initial pressure of the upstream pressure) with the reference slope at normal time. When using the slope of such a straight line, the same reference slope can be used regardless of the initial pressure Pi to perform self-diagnosis by pressure drop measurement from any set flow rate at the end of the semiconductor manufacturing process.

However, when the self-diagnosis is performed by closing the control valve or the shutoff valve as described above, the gas does not flow to the downstream side of the flow rate control device during the self-diagnosis period. Therefore, the self-diagnosis process is required to be performed during a period in which the semiconductor manufacturing process is stopped, and it is difficult to perform the self-diagnosis process at an arbitrary timing such as during the process.

When performing the self-diagnosis process while the process is stopped, in the gas supply system in which some pressure type flow controllers are connected in parallel, the self-diagnosis process must be performed after completion of the process in the maintenance mode with stopping the gas supply from the pressure type flow controller. Thus, a significant loss of time is required to perform the self-diagnostic process.

In response to this problem, as shown in FIG. 7 of Patent Document 3, a self-diagnosis method performed in the middle of the process is disclosed. According to Patent Document 3, by setting the period of closing the control valve for self-diagnosis to a very short period of time, it is possible to detect an abnormality of the restriction part even during the process.

However, in the method described in Patent Document 3, since the control valve is closed for a short period of time, a decrease in the flow rate in this period is unavoidable, and the process can be adversely affected. In recent years, it has been demanded to perform pulsed gas supply for ALD (Atomic Layer Deposition) at an accurate flow rate, but in some cases, it is not easy to perform self-diagnosis by closing the control valve between such pulsed gas supply.

Furthermore, when the diagnosis period is set to be short as described above, since the diagnosis is performed using the result of the pressure measurement in a small initial period of the pressure drop, the measurement error becomes large, leading to a decrease in the diagnosis accuracy. Therefore, it is not actually easy to accurately detect the abnormality in the restriction part without adversely affecting the process.

The present invention has been made to solve the above-mentioned problems, and it is a main object of the present invention to provide an abnormality detection method for a flow rate control device capable of detecting an abnormality in a restriction part with relatively high accuracy even in the middle of a process, and a flow rate monitoring method using the same.

Means for Solving Problem

An abnormality detection method according to an embodiment of the invention is for a flow rate control device provided in a gas supply system, the gas supply system including: the flow rate control device including a restriction part, a control valve provided upstream of the restriction part, a flow control pressure sensor for measuring an upstream pressure between the restriction part and the control valve, and a control circuit configured to control the control valve based on an output of the flow control pressure sensor; an inflow pressure sensor for measuring a supply pressure upstream of the control valve; and an upstream on/off valve provided upstream of the inflow pressure sensor; the abnormality detection method comprising: a step of closing the upstream on/off valve in a state where a gas flows downstream of the restriction part at a controlled flow rate by controlling an opening degree of the control valve based on the output of the flow control pressure sensor; a step of measuring a drop in the supply pressure upstream of the control valve using the inflow pressure sensor, after closing the upstream on/off valve while keeping the control valve open; and a step of diagnosing a condition of the flow rate control device based on a measured drop in the supply pressure.

In one embodiment, the above abnormality detection method further comprises a step of opening the upstream on/off valve when the supply pressure is greater than the upstream pressure, after a measurement of the drop in the supply pressure after closing the upstream on/off valve is completed.

In one embodiment, the step of measuring the drop in the supply pressure after closing the upstream on/off valve are repeated multiple times continuously or intermittently while keeping the control valve open to flow a gas downstream the restriction part.

In one embodiment, the step of diagnosing the condition of the flow rate control device comprises a step of detecting at least one of a clogging of the restriction part and an aperture expansion of the restriction part.

In one embodiment, the control valve is feedback controlled based on the output of the flow control pressure sensor so that the upstream pressure between the restriction part and the control valve is maintained at a set value, and a feedback control of the control valve continues to flow gas downstream the restriction part at a controlled flow rate during a period of measuring the drop in the supply pressure after closing the upstream on/off valve.

In one embodiment, the control valve is feedback controlled based on the output of the flow control pressure sensor so that the upstream pressure between the restriction part and the control valve is maintained at a set value, but an opening degree of the control valve is maintained at a constant regardless of the output of the flow control pressure during a period of measuring the drop in the supply pressure after closing the upstream on/off valve, and the control valve is feedback controlled again after the period of measuring the drop in the supply pressure.

In one embodiment, the gas supply system further includes a vaporizing section provided upstream of the inflow pressure sensor and configured to heat a liquid raw material to vaporize, the upstream on/off valve is a liquid filling on/off valve for controlling a supply of the liquid raw material to the vaporizing section, and with closing the upstream on/off valve after supplying the liquid raw material to the vaporizing section by temporarily opening the upstream on/off valve, the condition of the flow rate control device is diagnosed by measuring the drop in the supply pressure from an increased supply pressure due to the supply of the liquid raw material to the vaporizing section.

In one embodiment, the gas supply system further includes a vaporizing section provided upstream of the upstream on/off valve and configured to heat a liquid raw material to vaporize, and a capacity expansion portion is provided between the upstream on/off valve and the inflow pressure sensor.

In one embodiment, the inflow pressure sensor is incorporated in the flow rate control device.

In one embodiment, the step of diagnosing the condition of the flow rate control device is performed by comparing pressure drop data corresponding to the measured drop in the supply pressure with the corresponding reference pressure drop data.

In one embodiment, the pressure drop data is a time required for the supply pressure to drop from an initial pressure to a set pressure or a value of the supply pressure reached after a predetermined time has elapsed after closing the upstream on/off valve.

In one embodiment, the pressure drop data is a slope $\alpha$ of an approximate line defined by $\ln(P0(t)/P0i)=-\alpha t$, where $P0(t)$ is a function of the supply pressure with respect to time, $P0i$ is an initial pressure of the supply pressure, and t is time.

In one embodiment, the step of diagnosing the condition of the flow rate control device is performed by calculating a sum of differences between measured pressure values and reference pressure values for each sampling period.

In addition, a flow rate monitoring method according to an embodiment of the present invention comprises a step of continuously detecting a presence or an absence of an abnormality of the flow rate control device according to the above mentioned abnormality detection methods, a step of recognizing that a flow rate output from the flow rate control device is correct when no abnormality is detected in the flow rate control device, while recognizing that the flow rate output from the flow rate control device is incorrect when an abnormality is detected in the flow rate control device, thereby continuously monitoring the flow rate output from the flow rate control device.

In one embodiment, the flow rate monitoring method further includes a step of modifying information indicating a relationship between the upstream pressure and the flow rate used for flow control in the by the flow rate control device if the flow rate output from the flow rate control device is recognized as an incorrect flow rate.

In one embodiment, the flow rate monitoring method further comprises a step of determining a difference ($\Delta t - \Delta tr$) between a drop time $\Delta t$ of the supply pressure at the time of measurement and a reference drop time $\Delta tr$, and a step of updating at least one of constant K1 and constant K2 in equations that $Q=K1 \cdot P1$ or $Q=K2 \cdot P2^m(P1-P2)^n$ based on the difference ($\Delta t - \Delta tr$), wherein the equations represents a relationship between the upstream pressure and the flow rate, where Q is the flow rate, P1 is the upstream pressure, P2 is a downstream pressure of the restriction part, m and n are given exponents.

Effect of Invention

According to the abnormality detection method and the flow rate monitoring method according to the embodiments of the present invention, it is possible to appropriately detect the state of the flow rate control device, in particular, the presence or absence of abnormality in the restriction part of the pressure type flow rate control device, while supplying gas to the process chamber at a set flow rate controlled by the flow rate control device, and it is possible to monitor the flow rate based on the result of the abnormality detection.

DETAILED DESCRIPTION OF EMBODIMENT

Hereinafter, embodiments of the present invention will be described in detail with reference to the drawings. However, the present invention is not limited to the following embodiments.

Figure 1:
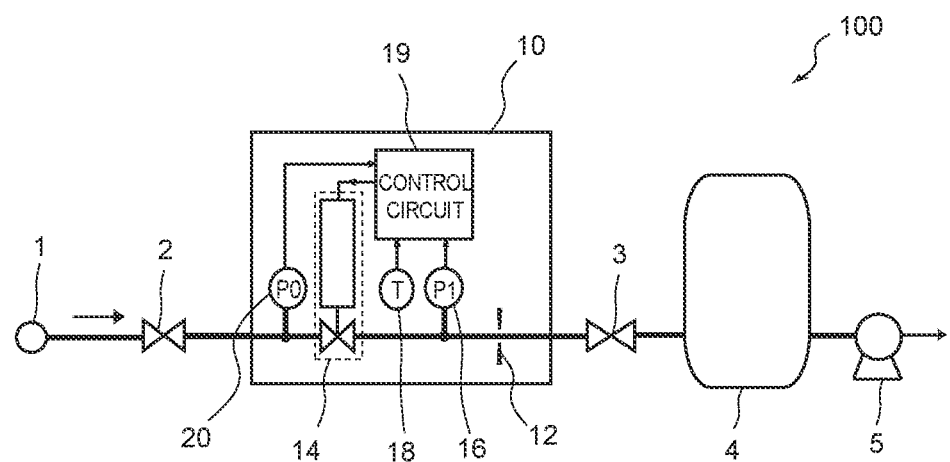
FIG. 1 is a diagram showing a gas supply system provided with a flow rate control device in which an abnormality detection method or a flow rate monitoring method according to an embodiment of the present invention is implemented.

FIG. 1 shows a gas supply system 100 provided with a flow rate control device 10 in which an abnormal detection method according to the present embodiment (self/diagnosis method) is performed. The gas supply system 100 includes a gas supply source 1, a flow rate control device 10 connected to the gas supply source 1, and a process chamber 4 connected to the flow rate control device 10. The gas supply system 100 is configured to supply the gas from the gas supply source 1 to the process chamber 4 at a controlled flow rate by the flow rate control device 10.

From the gas supply source 1, a variety of gases used in the semiconductor manufacturing process may be supplied, such as a raw material gas, an etching gas, or a carrier gas. A vacuum pump 5 is connected to the process chamber 4, which can depressurize the chamber and the flow path connected to the chamber. In FIG. 1, only one system of the gas supply line is shown. However, a plurality of gas supply lines each provided with the flow rate control device 10 may be connected to the process chamber 4 via a common line to supply various gases.

The gas supply system 100 also includes an upstream on/off valve 2 provided on the upstream side of the flow rate control device 10, and a downstream on/off valve 3 provided on the downstream side of the flow rate control device 10. The upstream on/off valve 2 is used to perform the abnormality detection process. The downstream on/off valve 3 is used to reliably stop the supply of gas to the process chamber. The downstream on/off valve 3 is also used for switching the supply gas species when a plurality of gas supply lines are provided.

The upstream on/off valve 2 and the downstream on/off valve 3 may be an on/off valve, such as a fluid/driven valve or an AOV (Air Operated Valve), a solenoid valve, or a motor/driven valve. As will be described later, the upstream on/off valve 2 may be a liquid filling valve (AOV) provided in the raw material vaporization supply apparatus. In addition, the downstream on/off valve 3 may be incorporated in the flow rate control device 10 as an orifice built/in valve integrally formed with a restriction part 12. If provided integrally as an orifice built/in valve, the downstream on/off valve 3 may be disposed on the upstream side of the restriction part 12. The downstream on/off valve 3 is not necessarily for the gas supply system 100 from the viewpoint of implementation of the abnormality detection process.

The flow rate control device 10 of the present embodiment is a pressure-type flow rate control device, and includes the restriction part 12, a control valve 14 on the upstream side of the restriction part, a flow rate control pressure sensor (or upstream pressure sensor) 16 and a temperature sensor 18 for measuring the pressure (i.e., upstream pressure P1) and the temperature between the control valve 14 and the restriction part 12, respectively. The flow rate control device 10 also includes a control circuit 19. Although not shown, the flow rate control device 10 may be provided with a downstream pressure sensor for measuring the downstream pressure P2 that is the pressure downstream of the restriction part 12.

Furthermore, in one embodiment, the flow rate control device 10 includes the inflow pressure sensor 20 for measuring the pressure of the upstream side of the control valve 14, and the abnormality detecting step of the present embodiment is performed using the output of the inflow pressure sensor 20. However, the inflow pressure sensor 20 may be provided outside the flow rate control device 10 as long as it is possible to measure the pressure between the upstream on/off valve 2 and the control valve 14, i.e., the supply pressure P0 to the flow controller 10.

The flow controller 10 is configured to control the flow rate of the gas flowing downstream of the restriction part 12 by adjusting the opening degree of the control valve 14 based on the output of the flow control pressure sensor 16. As the restriction part 12, an orifice plate, a critical nozzle or a sonic nozzle, or the like can be used. The aperture diameter of the orifice or the nozzle is set to, for example, 10 μm to 2000 μm.

As the control valve 14, a piezoelectric element driven valve is used, for example. The piezo element driven valve is possible to adjust the movement amount of the diaphragm valve element by the control of the applied voltage to the piezo element, and it is possible to adjust the opening arbitrarily. Further, as the flow control pressure sensor 16 and the inflow pressure sensor 20, a pressure sensor having a pressure sensitive diaphragm made of silicon single crystal and a strain gauge or a capacitance manometer can be used. As the temperature sensor 18, a thermistor or platinum RTD is used, for example.

In the flow rate control device 10, the control circuit 19 controls the control valve 14 based on the output of the flow control pressure sensor 16 and the temperature sensor 18 so that the flow rate of the gas passing through the restriction part 12 becomes the set flow rate. The control circuit 19 may include a CPU, memories, A/D converters, etc. and computer programs configured to perform the operations described below. The control circuit 19 may be implemented by combinations of hardware and software.

More specifically, the flow rate control device 10 performs a flow control by utilizing the principle when the critical expansion condition P1/P2 about 2 (where, P1 is the upstream pressure, P2 is the downstream pressure, about 2 is the case of nitrogen gas) is satisfied, the flow rate Q is determined by the upstream pressure P1 or a control pressure P1 regardless of the downstream pressure P2.

When the critical expansion condition is satisfied, the flow rate Q is calculated from $Q=K1 \cdot P1$, where K1 is a constant depending on the species and the temperature of the fluid. Furthermore, if it comprises a downstream pressure sensor (not shown), even when not satisfying the critical expansion condition, the flow rate Q can be calculated from $Q=K2 \cdot P2^m(P1/P2)^n$, where K2 is a constant depending on the species and the temperature of the fluid, m and n are the indices derived based on the actual flow rate.

To perform the flow control, the set flow rate Qs is input to the control circuit 19, and the control circuit 19 obtains the arithmetic flow rate Qc according to the above equation based on the output of the flow control pressure sensor 16. Then, the control valve 14 is feedback controlled so that the calculated flow rate Qc approaches the input set flow rate Qs. The calculated flow rate Qc may be displayed on an external monitor as a flow rate output value.

In the flow rate control device 10 as described above, when the abnormality, such as clogging or corrosion, occurs in the restriction part 12, the above constant K1 or constant K2 is changed, the relationship between the upstream pressure P1 and the flow rate Q is different from the normal. As a result, it becomes difficult to supply the gas at an accurate flow rate based on the upstream pressure P1.

To detect the occurrence of abnormality in the restriction part 12, in the present embodiment, the abnormality detection step is performed while supplying a gas at a control flow rate to the process chamber 4. The abnormal detection step in the present embodiment is not performed based on the drop of the upstream pressure P1 after closing the control valve 14 as in the conventional method, but performed by measuring the drop of the supply pressure P0 using the inflow pressure sensor 20 after closing the upstream on/off valve 2 while keeping the control valve 14 open and continuing the supply of gas to the process chamber 4.

Hereinafter, a specific example of the abnormality detection method according to the present embodiment will be described with reference to FIGS. 2 to 4.

Figure 2:
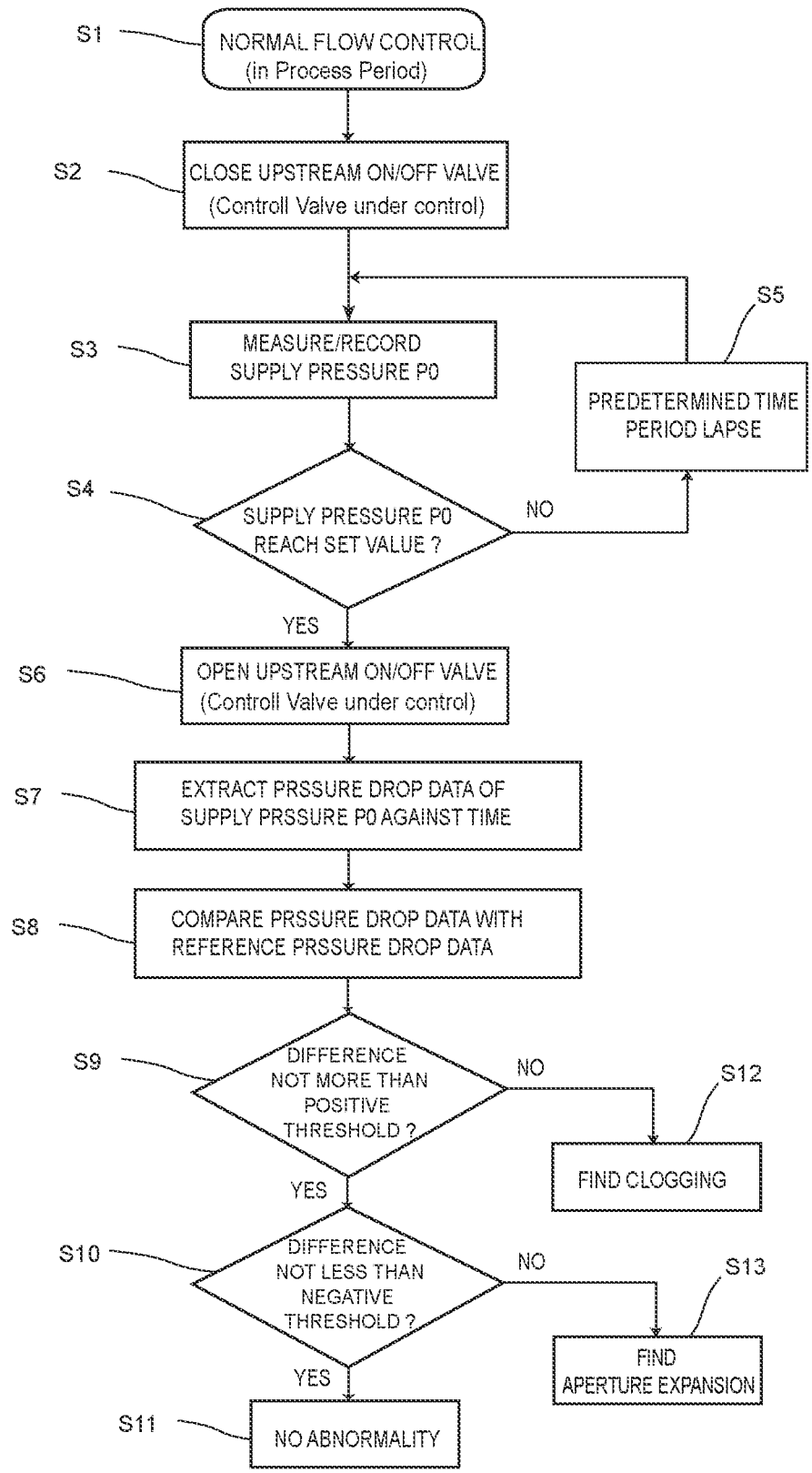
FIG. 2 is a flowchart showing an abnormality detection method according to an embodiment of the present invention.

The abnormality detecting step in the present embodiment, as shown in step S1 of FIG. 2, is started from the normal flow control state or during the process period for supplying a gas to the process chamber 4 at a desired flow rate using the flow rate control device 10. In the normal flow control state, the opening degree of the control valve 14 is feedback controlled based on the output of the flow control pressure sensor 16, with the upstream pressure P1 being maintained at a set pressure, so that the flow rate of the gas flowing downstream of the restriction part is maintained at a constant controlled flow rate.

Figure 3:
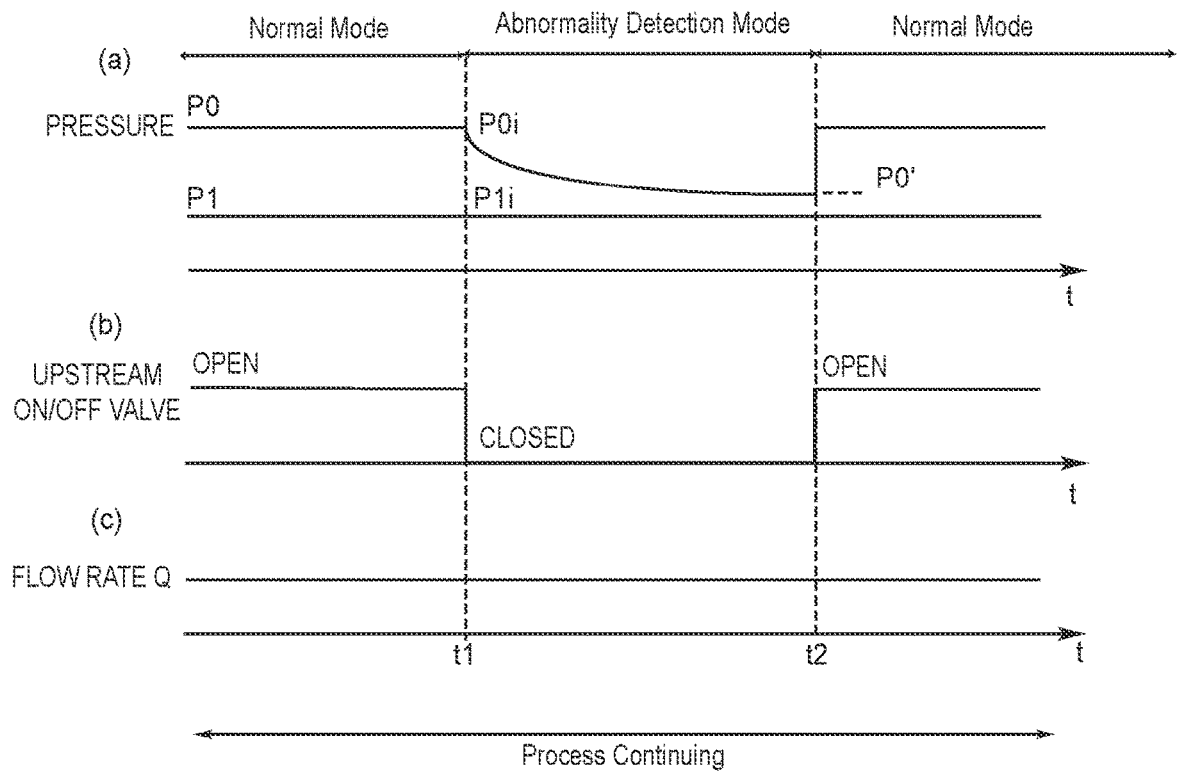
FIG. 3 shows (a) changes of the supply pressure P0 and the upstream pressure P1 with respect to time, (b) the opening and closing operation of the upstream on/off valve, and (c) a graph of the flow rate Q of the gas flowing downstream of the restriction part, when performing the abnormality detection method according to the embodiment of the present invention.

As shown in FIG. 3 (b), in the normal flow control state before the abnormal detection process (i.e., normal mode), the upstream on/off valve 2 is maintained in the open state and the downstream on/off valve 3 is also maintained in open state. The downstream on/off valve 3 is always maintained in an open state over the process continuing period including the period for performing the abnormality detection.

In the present embodiment, at the start of the abnormality detection process, the flow rate of the gas supplied to the process chamber 4 or the upstream pressure P1 (initial pressure P1i) may have an arbitrary value. That is, the abnormality detection step can be started at any timing in the middle of the semiconductor manufacturing process.

At the start of the abnormality detection process, the supply pressure P0 measured by the inflow pressure sensor 20 may be, for example, 50 to 500 kPa·abs, while the upstream or the control pressure P1 measured by the flow control pressure sensor 16 may be, for example, 1 to 350 kPa·abs. The supply pressure P0 has a sufficiently large value as compared with the control pressure P1 regardless of the control flow, but the control pressure P1 has a value corresponding to the control flow rate by the adjustment of the opening degree of the control valve 14. The downstream pressure P2, which is the pressure downstream of the restriction part 12, is maintained at, for example, a vacuum pressure such as equal to or lower than 100 Torr.

Next, as shown in step S2 and 3 (b), to start the abnormality detection, by closing the upstream on/off valve 2 at time t1, the process proceeds to the abnormality detection mode. At this time, in the present embodiment, the feedback control of the control valve 14 based on the output of the flow control pressure sensor 16 is continued by the control circuit 19. Thus, as shown in FIG. 3 (a), in the pressure type flow rate control device 10, even after the upstream on/off valve 2 is closed, as long as the supply pressure P0 is greater than the upstream pressure P1, the upstream pressure P1 is maintained at a desired value, therefore, as shown in FIG. 3 (c), it is possible to continue to flow the gas at a desired flow rate Q on the downstream side of the restriction part 12.

Next, as shown in step S3, using the inflow pressure sensor 20, the drop of the supply pressure P0 after closing the upstream on/off valve 2 is measured and the result is recorded in the memory. As shown in FIG. 3 (*a*), after the upstream on/off valve 2 is closed at time t1, the supply pressure P0 decreases with the outflow of gas through the restriction part 12. On the other hand, the upstream pressure P1, by the feedback control of the control valve 14, is maintained constant even after the time t1. Therefore, even during the period of measuring the drop of the supply pressure P0 after closing the upstream on/off valve 2, the downstream side of the restriction part 12 of the flow rate control device 10, it is possible to continue to flow the gas at a controlled flow rate Q and it is possible to continue the process.

In the pressure type flow rate controller in which an inner volume between the control valve 14 and the restriction part 12 is designed very small for improving the falling response, the drop of the upstream pressure P1 after closing the control valve 14 is steep. Therefore, in the conventional method of measuring the drop of the upstream pressure P1 after closing the control valve 14, it is difficult to perform the diagnosis (abnormality detection) with high accuracy, also, fluctuation of the flow rate is unavoidable. In contrast, when utilizing the pressure drop of the supply pressure P0 at the upstream side of the control valve 14 as in the present embodiment, even a flow rate control device of small internal volume with improved falling response as described above can perform the abnormality detection accurately while continuing the flow control.

Measurements of the pressure drop of the supply pressure P0 shown in step S3 is performed by storing the output of the inflow pressure sensor 20 in the memory at a predetermined sampling period, for example. As shown in steps S4 and S5, recording of data of the supply pressure P0 is continued every sampling period (predetermined period) until the supply pressure P0 reaches the set value, thereby, the data representing the pressure drop of the supply pressure P0 with respect to time is obtained.

However, the measurements of the pressure drop of the supply pressure P0 is not limited to this and may be performed in various manners. For example, when the time until the supply pressure P0 reaches the set pressure P0' is used as the pressure drop data, the measurements of the pressure drop of the supply pressure P0 is performed by simply measuring the time until reaching the set pressure P0'. In addition, the measurement of the pressure drop of the supply pressure P0 could be sufficient only to once measure the supply pressure P0 at the time after a predetermined time has elapsed from the time of closing the upstream on/off valve 2.

In the present embodiment, as shown in step S6 of FIG. 2 or FIGS. 3 (*a*) and (*b*), the measurement of the supply pressure P0 is continued until the supply pressure P0 reaches the set pressure P0' and the upstream on/off valve 2 opens at time t2. Incidentally, the measurement of the pressure drop of the supply pressure P0 may be performed in any period within the period from the time t1 of closing the upstream on/off valve 2 to the time t2 of opening the upstream on/off valve 2. It is not necessarily performed over the entire period from time t1 to time t2. The measurement of the pressure drop of the supply pressure P0 may be started from the time when the supply pressure P0 is lowered to a predetermined pressure after the upstream on/off valve 2 is closed.

Further, the time t2 at which the upstream on/off valve 2 is opened may be when the supply pressure P0 reaches the set pressure P0' as shown in steps S4 and S6, or it may be when a predetermined time has elapsed from the closing time t1. In any case, the time t2 is set to the time until the supply pressure P0 is lowered to reach the same pressure as the upstream pressure P1, or more preferably, the time until it reaches a predetermined higher value of the set pressure P0' with respect to the upstream pressure P1.

The reason is that when the supply pressure P0 is lowered to the same pressure as the upstream pressure P1, the upstream pressure P1 with a decrease in the supply pressure P0 also decreases, it is impossible to supply the gas at a desired flow rate downstream of the restriction part 12. Therefore, during the process continuation, the upstream on/off valve 2 should be opened while the supply pressure P0 is larger than the upstream pressure P1 to avoid a decrease in a flow rate by recovering the supply pressure P0.

Figure 5:
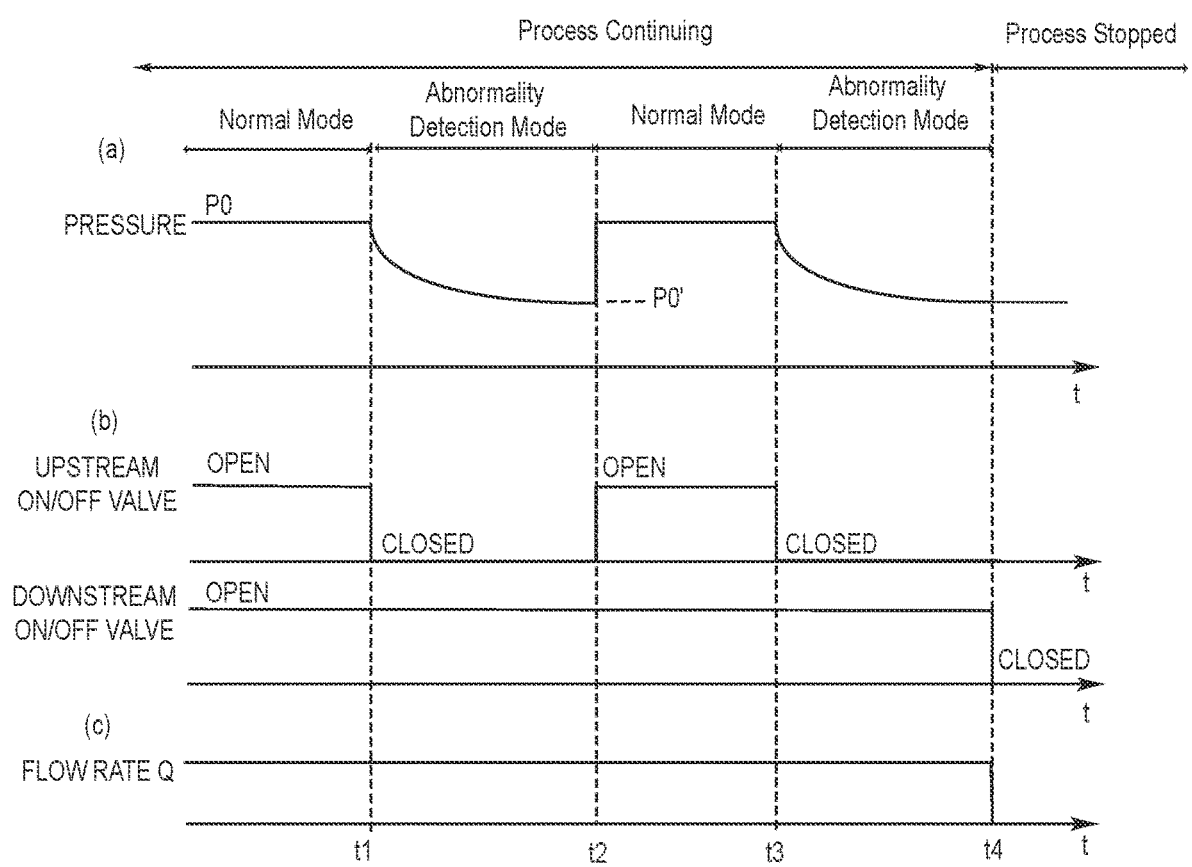
FIG. 5 shows (a) the supply pressure P0 with respect to time, (b) the opening and closing operation of the upstream on/off valve and the downstream on/off valve, and (c) a graph showing the flow rate Q of the gas flowing downstream of the restriction part, when performing the abnormality detection method according to another embodiment of the present invention.

However, as in other embodiments shown in FIG. 5, such as a period between the end of the process, when the gas supply may be shut off after the abnormal detection step, it is also possible to end the abnormal detection step closed without opening the upstream on/off valve 2. Another embodiment shown in FIG. 5 will be described later.

In the present embodiment, the state of the flow rate control device 10, specifically a clogging or an aperture expansion of the restriction part 12 (diameter enlargement or partial missing around the opening) is diagnosed based on the supply pressure P0 drop characteristics measured as described above. This diagnosis is performed by the comparison with the reference lowering characteristics at the time of normal which is stored in the memory in advance.

Figure 4:
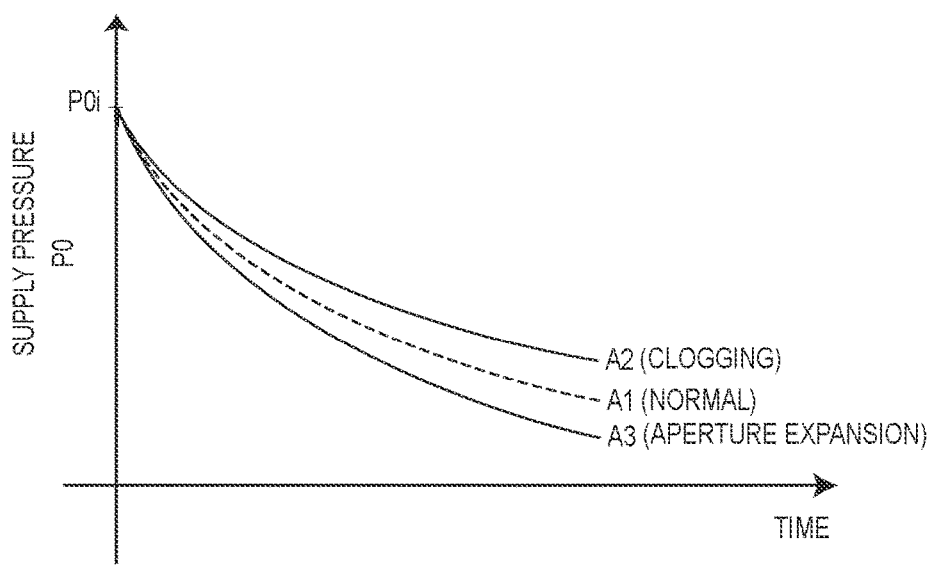
FIG. 4 shows graphs showing a drop in supply pressure after closing the upstream on/off valve when in the normal state or when an abnormality has occurred in the restriction part.

FIG. 4 shows the pressure drop curve A1 of the supply pressure P0 after closing the upstream on/off valve 2 in normal cases, the pressure drop curve A2 of the supply pressure P0 when the clogging is occurring, and the pressure drop curve A3 of the supply pressure P0 when the aperture expansion due to corrosion or the like is occurring.

As can be seen from FIG. 4, if the clogging occurs in the restriction part 12, since the gas is more difficult to flow, the pressure drop curve A2 with respect to the pressure drop curve A1 in normal cases deviates upward. At this time, the time required for the supply pressure P0 to decrease to the predetermined value becomes longer. Further, the supply pressure P0 after a predetermined time has elapsed after closing the upstream on/off valve 2 is higher than when normal.

On the other hand, if the aperture expansion of the restriction part 12 occurs, since the gas is easier to flow, the pressure drop curve A3 with respect to the pressure drop curve A1 in normal cases deviates downward. At this time, the time required for the supply pressure P0 to decrease to a predetermined value becomes shorter. Further, the supply pressure P0 after a predetermined time has elapsed after closing the upstream on/off valve 2 is lower than when normal.

Therefore, by comparing the measured pressure drop curve and the pressure drop curve in normal cases, it is possible to determine whether or not an abnormality, such as a clogging or an aperture expansion, has occurred in the restriction part.

Referring again to FIG. 2, as shown in steps S7 and S8, abnormality detection based on the measurement of the pressure drop of the supply pressure P0 can be executed by the extraction of the pressure drop data corresponding to the change of the supply pressure P0 against time, and the comparison of the extracted pressure drop data with the reference pressure drop data.

Here, the pressure drop data is data corresponding to the characteristics of the pressure drop. For example, the pressure drop data would be a time period $\Delta t$ required for the supply pressure P0 to drop from the initial supply pressure P0$i$ (or preset start pressure) to the set pressure P0', or a value of the supply pressure P0 reached after a predetermined time has elapsed from closing the upstream on/off valve 2. The resulting pressure drop data can be compared with the corresponding reference pressure drop data, which is typically a normal case data, read from memory to provide anomaly detection.

In the present embodiment, the normal pressure drop data measured in advance before factory shipment is used as the reference pressure drop data, but the present invention is not limited to this. As the reference pressure drop data, the measurement data at abnormal, previous measurement data, set data not based on measurement or the like can be used.

As an abnormality detection method based on the pressure drop characteristic, various methods described in Patent Document 2 (WO2017/170174) can be applied. As described in Patent Document 2, the upstream pressure P1 after closing the control valve 14 can decay exponentially, and the approximate straight line expressed by the equation that $\ln(P1(t)/P1i)$, $\alpha t$ is obtained from the plot of the value by dividing the upstream pressure P1 by the initial pressure P1$i$ and taking the logarithm. It has been confirmed that the slope $\alpha$ of the approximate straight line is substantially constant regardless of the magnitude of the initial pressure P1$i$, which corresponds to the flow rate at the start of diagnosis.

Therefore, also in the present embodiment, the slope $\alpha$ of the approximate straight line (a straight line obtained by the least squares method or the like) defined by $\ln(P0(t)/P0i)=-\alpha t$ may be extracted from the measurement result of the supply pressure P0 as the pressure drop data, and this may be compared with the reference slope $\alpha r$ in normal cases for diagnosis. Thus, the diagnosis can be performed using the common reference slope $\alpha r$ regardless of the magnitude of the initial supply pressure P0$i$. In the above equation, P0($t$) is a function of the supply pressure P0 with respect to time, P0$i$ is the initial pressure of the supply pressure P0 (pressure at the start of the pressure drop measurement), t is the time.

In addition, as described in Patent Document 2, even when the slope $\alpha$ of the approximate straight line is used as the pressure drop data, the reference slope $\alpha r$ may be appropriately determined in accordance with the initial supply pressure P0$i$, and the diagnosis may be performed based on the comparison with the appropriate reference slope $\alpha r$.

Furthermore, it is not limited that the feedback control of the control valve 14 based on the output of the flow control pressure sensor 16 is continued even during the abnormality detection process. During the abnormality detection process, i.e., during the period of measuring the drop of the supply pressure P0 after closing the upstream on/off valve 2, regardless of the output of the flow control pressure sensor 16, the control valve 14 may be maintained at a constant opening degree.

In particular, when the supply pressure P0 and the set pressure P0' is sufficiently large with respect to the upstream pressure P1, during the term of measuring the drop of the supply pressure P0, even if the opening degree of the control valve 14 is maintained at constant, the decrease in the upstream pressure P1 is considered almost none. Therefore, it is possible to keep the gas flowing at a substantially controlled flow rate. Further, by fixing the opening degree of the control valve 14, the supply pressure P0 is considered to decay more exponentially, thus it can improve the diagnostic accuracy particularly when using the above slope $\alpha$ of the approximate line as the pressure drop data.

Even when fixing the opening degree of the control valve 14 in the limited period in which the drop of the supply pressure P0 is measured, after the measurements, the control valve 14 is feedback controlled again based on the output of the flow control pressure sensor 16 to return to the normal flow control mode with opening the upstream on/off valve 2. This allows the process to continue properly after diagnosis.

Hereinafter, as the pressure drop data, the case of using the drop time $\Delta t$ until the supply pressure P0 reaches the set pressure P0' will be illustrated with the subsequent steps. In step S8, the drop time $\Delta t$ measured is compared with the reference drop time $\Delta tr$, in this example, the value of the difference ($\Delta t-\Delta tr$) obtained by subtracting the reference drop time $\Delta tr$ from the measured drop time $\Delta t$ is obtained. As the reference drop time $\Delta tr$, a value corresponding to the supply pressure P0 is used.

Next, as shown in step S9, it is determined whether or not the difference $\Delta t-\Delta tr$ is equal to or less than a preset positive threshold value. Here, when the value of the difference ($\Delta t-\Delta tr$) is large and exceeds the positive threshold (for example, 1 second) (NO in step S9), it is determined that the restriction part 12 is less likely to flow than in the normal state, and it is determined that clogging has occurred in the restriction part 12 as shown in step S12.

On the other hand, in step S9, when the difference ($\Delta t-\Delta tr$) is equal to or less than the positive threshold (YES in step S9), it is determined that clogging has not occurred, and then in step S10, it is determined whether or not the difference ($\Delta t-\Delta tr$) is equal to or greater than the negative threshold (for example, −1 second).

In step S10, the difference ($\Delta t-\Delta tr$) takes a negative value, and when the absolute value is larger than the absolute value of the threshold value (i.e., when the difference ($\Delta t-\Delta tr$) is smaller than the negative threshold value: NO in step S10), it is determined that the gas is easier to flow through the restriction part 12 than when it is normal, and it is determined that the aperture expansion has occurred in the restriction part 12 as shown in step S13.

On the other hand, in step S10, when the difference ($\Delta t-\Delta tr$) is equal to or larger than the negative threshold (YES in step S10), it is determined that neither significant clogging nor aperture expansion has occurred, and it is determined that there is no abnormality in step S11.

As described above, by comparing the pressure drop data with the reference pressure drop data, it is possible to detect clogging and aperture expansion of the restriction part. In addition, without extracting the pressure drop data from the measured supply pressure, it is also possible to perform diagnosis by directly comparing the measured values of supply pressure P0 with a corresponding reference pressure value. For example, by measuring pressure value for each sampling period and calculating the sum of the difference between the corresponding reference pressure value, it can be determined that there is clogging when the sum is equal to or greater than the positive threshold value, and it can also be determined that there is an opening expansion when the sum is equal to or less than the negative threshold value.

When the occurrence of the abnormality in the restriction part is detected as described above, the relationship between the upstream pressure P1 and the flow rate Q of the gas on the downstream side of the restriction part is different from that in the normal state. That is, if the abnormality in the restriction part has occurred, it is likely that the output flow rate of the flow rate control device to be calculated based on the output of the upstream pressure sensor is different and incorrect from the normal.

Therefore, by the abnormality detection method of the restriction part described above, by continuously detecting the presence or absence of abnormality of the flow rate control device, it is possible to monitor the flow rate accuracy. Specifically, it can be recognized that the flow rate output from the flow rate control device is correct when the abnormality is not detected, and the flow rate output from the flow rate control device is incorrect when the abnormality is detected, thereby it is possible to continuously monitor the flow rate controlled by the flow rate control device.

In addition, the flow rate control device 10 can be calibrated so as to flow gas at a more accurate flow rate by updating information indicating the relationship between the upstream pressure P1 and the flow rate Q (for example, the value of the constant K1 in the above equation that $Q=K1 \cdot P1$) along with the flow rate monitoring based on the diagnosis result of the presence or absence of abnormality. For example, when the difference ($\Delta t - \Delta tr$) described above is greater, since it is considered that the gas is in a state of more difficult to flow, it is possible to flow the gas at a more accurate flow rate by updating the constant K1 to smaller by a value corresponding to the magnitude of the difference.

Next, an abnormality detection method according to another embodiment will be described with reference to FIG. 5.

In the embodiment shown in FIG. 5, a plurality of abnormality detection step is performed at intervals in a period immediately before stopping the process. More specifically, it performs the first abnormality detection step by closing the upstream on/off valve 2 at time t1, then, the supply pressure P0 is recovered by opening the upstream on/off valve 2 at time t2 when the supply pressure P0 reaches the set pressure P0'. Thereafter, through the normal flow control mode, it performs a second abnormality detection step by closing the upstream on/off valve 2 at time t3, and finally stops the process by closing the downstream on/off valve 3 at time t4.

As shown in FIG. 5 (b), the last abnormality detection step performed immediately before stopping the process, the upstream on/off valve 2 after the end is maintained closed and it is not opened. Further, the downstream on/off valve 3 is maintained in an open state during the process continuing but is closed when the process is stopped. As a result, as shown in FIG. 5(c), the flow rate Q of the supplied gas can be reduced to 0.

As shown in FIGS. 5 (a)-(c), even in the present embodiment, the abnormality detection step is performed while continuing the process by flowing a gas at a constant flow rate. Except for the last abnormality detection step, after the measurement of the drop in the supply pressure P0 after closing the upstream on/off valve is completed, since the step of opening the upstream on/off valve when the supply pressure P0 is greater than the upstream pressure is performed, while maintaining the flow rate Q constant, it is possible to recover the supply pressure P0. For this reason, it is possible to intermittently repeat the abnormality detection process a plurality of times during the process period.

Although FIG. 5 illustrates an embodiment in which the abnormality detection step is performed a plurality of times in a period immediately before the end of the process, the present invention is not limited to this, and it is needless to say that the abnormality detection step may be performed a plurality of times in an arbitrary period during the process period. In addition, a plurality of abnormality detection steps during the process period may be performed continuously without an interval therebetween. Since the self-diagnosis process can be performed at arbitrary timing any number of times during the process period, it is also possible to constantly monitor the occurrence of abnormality in the restriction part. Further, by repeating the abnormality detection process, the flow rate can be continuously monitored at all times.

Further, in another embodiment, the abnormality detection step is not limited to be performed in a period of controlling a flow rate at constant and may be performed when the control flow rate is stepped down from the first flow rate to the second flow rate. In this case, from a state where the control valve 14 is feedback-controlled to flow the gas at the first flow rate (e.g., 100% flow rate) with the upstream on/off valve 2 opened, the upstream on/off valve 2 is closed and the opening degree of the control valve 14 is fixed. Thereafter, the pressure drop of the supply pressure P0 is measured to diagnose the restriction part 12 by comparing with the reference pressure drop under normal simultaneous conditions. In addition, a decrease in the upstream pressure P1 also occurs as the decrease in the supply pressure P0 progresses. The output of the flow control pressure sensor 16 is monitored while the upstream pressure P1 reaches the pressure corresponding to the second flow rate (e.g., 50% flow rate) and, if it reaches, the control valve 14 is feedback controlled again and the upstream on/off valve 2 is opened. In this way, while continuing the process with the flow rate control, by utilizing the pressure change due to gas outflow during the flow rate step-down, it is possible to perform incorporating the abnormality detection step.

Hereinafter, an embodiment in which the raw material vaporization supply apparatus 30 is provided on the upstream side of the flow rate control device 10 will be described with reference to FIGS. 6 and 7.

Figure 6:
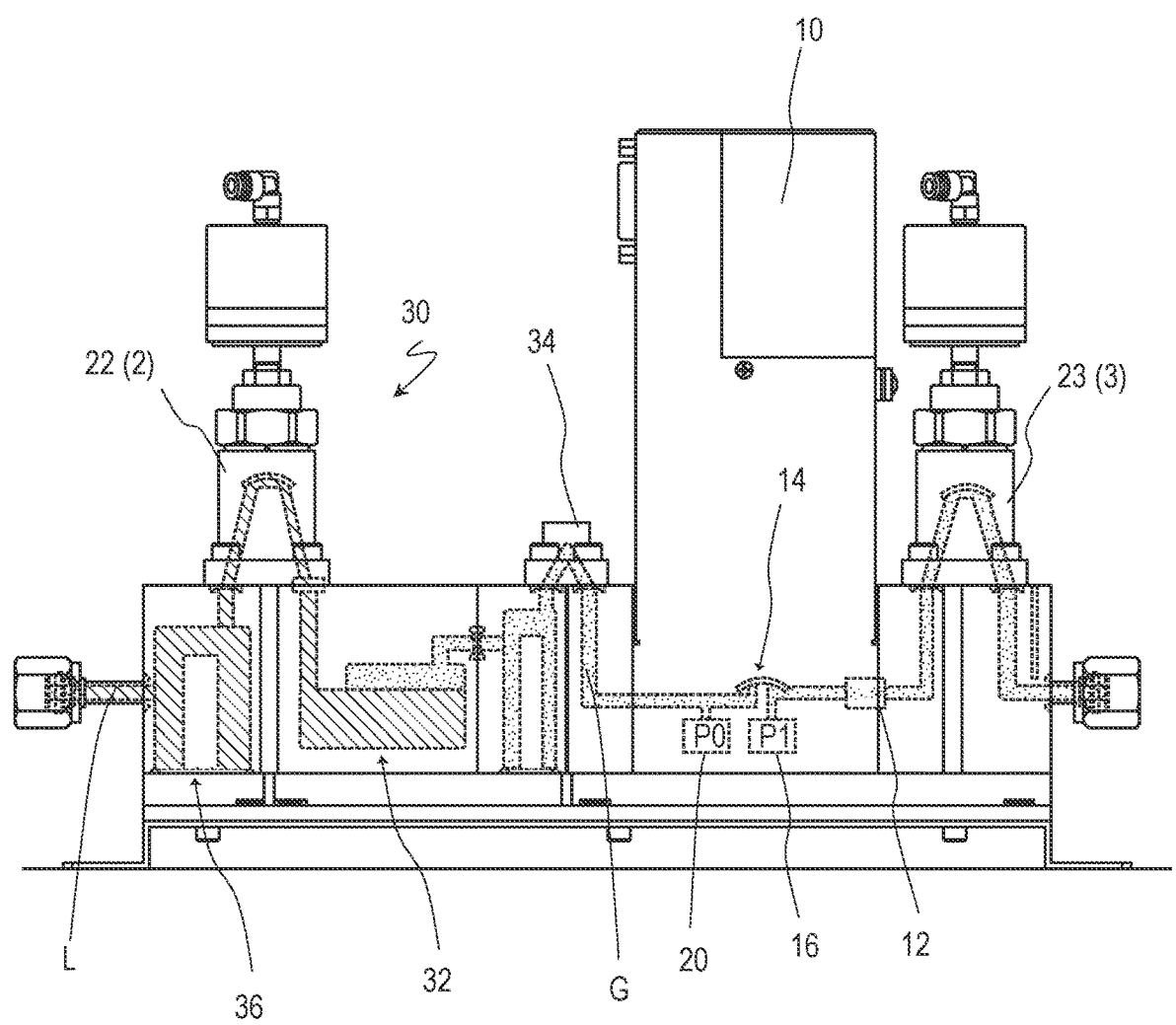
FIG. 6 is a diagram showing a configuration in which the raw material vaporization supply device is provided on the upstream side of the flow rate control device.

As shown in FIG. 6, in the present embodiment, the gas supply system is configured such that after the liquid raw material L is vaporized by the raw material vaporization supply apparatus 30, the raw material gas G is supplied to the process chamber at a flow rate controlled by the flow rate control device 10. The raw material vaporization supply apparatus 30 is used to supply raw material gases to a process chamber in a semiconductor manufacturing apparatus for forming a film by, for example, metal/organic chemical vapor deposition (MOCVD). Such a raw material vaporization supply apparatus is disclosed in Patent Document 4, for example.

For example, a liquid raw material of an organometallic material, such as TEOS (Tetraethyl orthosilicate) or HCDS (Hexachlorodisilane), stored in a liquid storage tank is supplied to the raw material vaporization supply apparatus 30 at a constant pressure. The liquid raw material L is vaporized by a heater (not shown) disposed around the vaporizing section 32 of the raw material vaporization supply apparatus 30, and the vaporized raw material gas G is controlled to a predetermined flow rate by the flow rate control device 10 and supplied to the process chamber.

The boiling point of the liquid raw material L of the organometal may exceed 150° C., and the raw material vaporization supply apparatus 30 may be heated to a temperature of, for example, 200° C. or higher. In order to prevent the temperature from decreasing in the vaporizing section 32, the raw material vaporization supply apparatus 30 of the present embodiment is provided with a preheating section 36 provided with a heater (not shown), and the liquid raw material L supplied to the vaporizing section 32 is heated in advance.

Between the vaporizing section 32 and the flow rate control device 10, a flow path block 34 is provided which is maintained at a high temperature to prevent re-liquefaction of the vaporized raw material gas G. As the flow rate control device 10, a known high temperature pressure type flow controller is used. The flow rate control device 10 includes a control valve 14 of the high-temperature type, the restriction part 12 (here, the orifice plate of the gasket type disposed at the boundary of the flow path block) provided the downstream of the control valve 14, a flow control pressure sensor 16 for measuring the upstream pressure P1 between the control valve 14 and the restriction part 12, and an inflow pressure sensor 20 for measuring the supply pressure P0 of the upstream side of the control valve 14. However, the inflow pressure sensor 20 may be provided in the vaporizing section 32, the flow path block 34, or the like.

In a gas flow path downstream of the flow rate control device 10, the stop valve 23 is provided, it is possible to shut off the flow of gas as needed. A known air operated valve or a solenoid valve can be used as the stop valve 23 or the downstream on/off valve 3 in FIG. 1.

In the raw material vaporization supply apparatus 30 configured as described above, in order to control the supply amount of the liquid raw material L to the vaporizing section 32, the liquid filling on/off valve 22 is provided on the upstream side of the vaporizing section 32. In the present embodiment, the liquid filling on/off valve 22 is used as the upstream on/off valve 2 and the drop in the supply pressure P0 in a predetermined period after closing the liquid filling on/off valve 22 is measured to perform the abnormality detection step. Further, this makes it possible to detect whether there is no abnormality in the flow rate control device.

The liquid filling on/off valve 22 is operated to control the supply amount of the liquid raw material L to the vaporizing section 32 in response to the pressure in the vaporizer chamber or the output of the inflow pressure sensor 20. More specifically, the liquid filling on/off valve 22 is temporarily opened to supplement the raw material shortage and supply a predetermined amount of liquid raw material L to the vaporizer unit 32 when the supply pressure P0 indicated by the inlet pressure sensor 20 decreases to a predetermined threshold value. As the liquid filling on/off valve 22, an air operated valve for controlling the opening and closing of the valve element by utilizing air pressure is used, for example.

Similarly to the raw material vaporization supply apparatus described in Patent Document 4, the raw material vaporization supply apparatus 30 may be provided with a liquid detection unit (not shown) that detects that a liquid raw material L exceeding a predetermined amount is supplied to the vaporizing section 32. By closing the liquid filling on/off valve 22 when the liquid detecting section detects the liquid, it is possible to prevent oversupply of the liquid raw material L to the vaporizing section 32. As the liquid detection unit, a thermometer (platinum RTD, thermocouple, thermistor, etc.), a liquid level gauge, or a load cell, disposed in the vaporizer chamber can be used.

Figure 7:
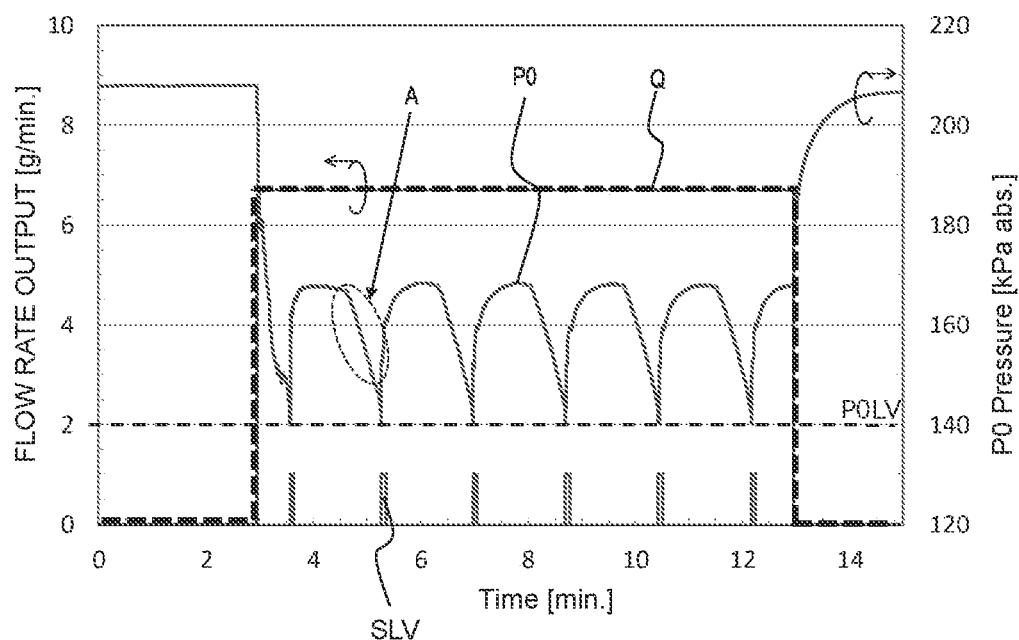
FIG. 7 is a diagram showing opening and closing operation of the liquid filling valve of the raw material vaporization supply device and a change of the gas pressure in the vaporization unit (supply pressure P0) with respect to time.

FIG. 7 shows graphs of an open/close operation signal SLV applied to the liquid filling on/off valve 22, the change of the supply pressure P0 with respect to time, and the flow rate Q of the gas flowing downstream the flow rate control device 10.

First, in the first stage where the flow rate Q is 0, a sufficient amount of the liquid raw material L is supplied to the vaporizing section 32 and is vaporized. Since the control valve 14 is closed in a state where the gas is filled, the supply pressure P0 indicates a high value. At this time, the liquid filling on/off valve 22 is closed.

Thereafter, by starting the gas flow at a controlled flow rate with opening the control valve 14, the supply pressure P0 is rapidly decreases. In addition, as the liquid raw material in the vaporizing section 32 is vaporized and consumed, the supply pressure P0 further decreases. The decrease in the supply pressure P0 is monitored by the inflow pressure sensor 20.

When the supply pressure P0 reaches a preset threshold P0LV, it is determined that the amount of the liquid material L in the vaporizing section 32 becomes too small, the liquid-filling on/off valve 22 is temporarily opened in accordance with the open/close operation signal SLV, and a predetermined amount of the liquid material L is supplied to the vaporizing section 32. As a result, the amount of gas generated in the vaporizing section 32 increases and the supply pressure P0 rises and recovers.

Thereafter, as the gas is supplied, the amount of the liquid raw material L in the vaporizing section 32 also decreases, and the supply pressure P0 starts to decrease again. In the present embodiment, the pressure drop characteristic is measured in the pressure drop period A (a portion surrounded by a broken line) and compared with the reference pressure drop characteristic to perform self-diagnosis, and the presence or absence of abnormality is detected.

As can be seen from the graphs, the supply pressure P0 shows a substantially similar change curve, in particular an equivalent drop characteristics in the pressure drop period A after a certain amount of liquid raw material L is replenished by opening the liquid filling on/off valve 22. Therefore, the self-diagnosis process can be performed using the pressure drop characteristic in the pressure drop period A. The self-diagnosis process may be performed, for example, by measuring the time during which the supply pressure drops from the first set pressure to the second set pressure during the pressure drop period and comparing this time with the normal time.

Further, the self-diagnosis process may be performed every time the liquid material L is replenished by temporarily opening the liquid filling on/off valve 22 when the supply pressure P0 is lowered after rising. Therefore, it is possible to constantly monitor the condition of the restriction part and thus the flow rate, while continuing to supply the vaporized raw material at a desired flow rate.

As can be seen from the above description, as the upstream on/off valve 2, not only the valve for shutting off the gas of the upstream passage, the on/off valve for controlling the supply of liquid as in the liquid filling on/off valve 22 may also be used. In addition, as shown in FIG. 7, it can be appropriately implemented abnormality detection step by measuring the drop of the supply pressure in a predetermined period after the pressure drops rather than measuring the supply pressure immediately after closing the upstream on/off valve 2.

Figure 8:
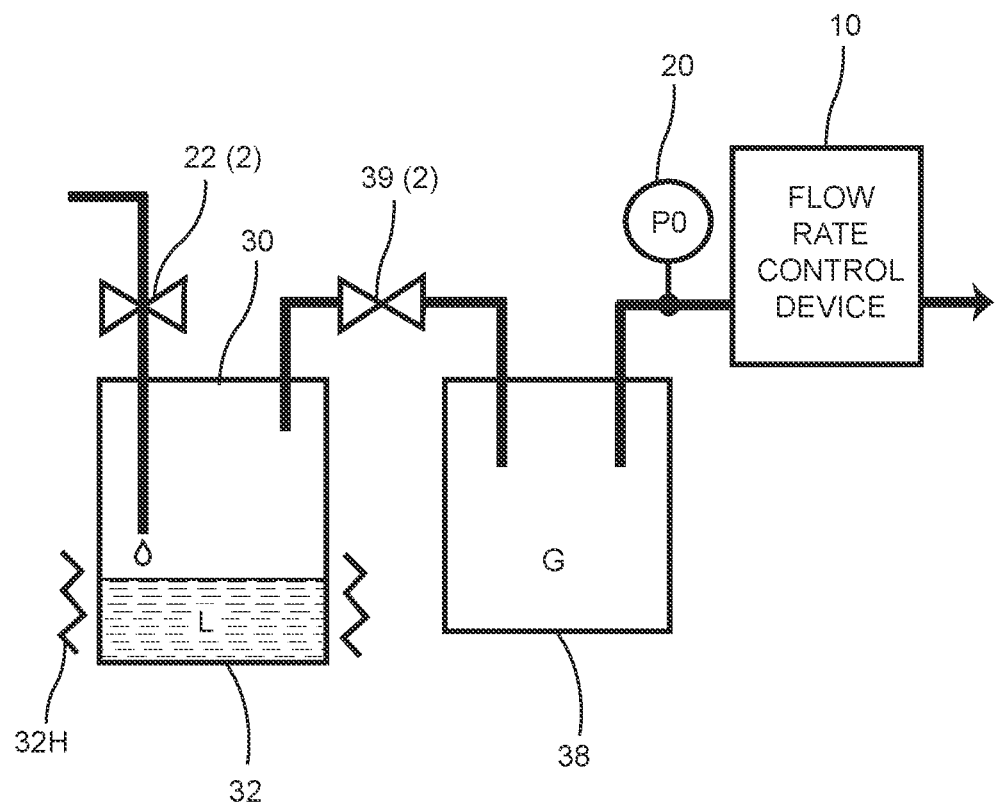
FIG. 8 is a diagram showing a modified configuration in which the raw material vaporization supply device is provided on the upstream side of the flow rate control device.

FIG. 8 shows a modified configuration in which the raw material vaporization supply apparatus 30 is provided on the upstream side of the flow rate control device 10. Also in the present modification, the raw material vaporization supply apparatus 30 generates the raw material gas G by vaporizing the liquid raw material L supplied to the vaporizing section 32 using the heater 32H. The supply of the liquid raw material L to the vaporizing section 32 is controlled by the liquid filling on/off valve 22.

In this modification, between the vaporizing section 32 and the flow rate control device 10, the buffer chamber 38 or tank as a capacity expansion unit is provided. In a state in which the on/off valve 39 disposed between the vaporizing section 32 and the buffer chamber 38 is opened, the raw material gas G generated by the vaporizing section 32 flows into the buffer chamber 38, and the raw material gas G is supplied to the flow rate control device 10 via the buffer chamber 38.

In the illustrated example, the inlet pressure sensor 20 for measuring the supply pressure P0 is connected to the flow path between the buffer chamber 38 and the flow rate control device 10 and arranged to measure the pressure of the gas downstream of the buffer chamber 38 (i.e., immediately upstream of the flow rate control device 10).

By providing the buffer chamber 38 in this manner, even when the pressure of the raw material gas G generated in the raw material vaporization supply apparatus 30 is liable to fluctuate, the influence thereof can be reduced and the abnormality detection process can be performed. Since the volume of the flow path between the raw material vaporization supply apparatus 30 and the flow rate control device 10 is increased by the buffer chamber 38, the variation of the generated gas pressure inside the raw material vaporization supply apparatus 30, the inflow pressure sensor 20 because it is difficult directly reflected in the pressure measurement.

The volume of the buffer chamber 38 is arbitrary, but can be set to 100 cc to 500 cc, for example. In the above description, the tank-shaped buffer chamber 38 is provided, but the present invention is not limited thereto. As far as the capacity of the upstream side of the inflow pressure sensor 20 can be expanded, it may form a capacity expansion portion by providing an expansion chamber in the flow path block or extending a part of the flow path extremely. The capacity expansion part has a volume of, for example, twice or more, preferably three times or more, of the volume of the flow path between the raw material vaporization supply apparatus 30 and the flow rate control device 10 without the volume expansion part.

Also in this modification, by using the liquid filling on/off valve 22 as the upstream on/off valve 2, it is possible to perform the abnormality detection step during the drop period of the supply pressure P0 after closing the liquid filling on/off valve 22.

However, as in the illustrated embodiment, when the on/off valve 39 is provided on the upstream side of the buffer chamber 38, the on/off valve 39 can also be used as the upstream on/off valve 2. In this case, after closing the on/off valve 39, it is possible to perform the abnormality detection by measuring the drop in the supply pressure of the gas flowing out of the buffer chamber 38 using the downstream-side inflow pressure sensor 20.

INDUSTRIAL APPLICABILITY

The abnormal detection method and the flow rate monitoring method of the flow rate control device according to the embodiments of the present invention is suitably utilized to detect the presence or absence of abnormality in the restriction part of the pressure-type flow rate control device and to monitor the flow rate of the pressure-type flow rate control device provided in the MOCVD gas supply system.

DESCRIPTION OF NUMERALS

1 Gas supply source
2 Upstream on/off valve
3 Downstream on/off valve
4 Process chamber
5 Vacuum pump
10 Flow rate control device
12 Restriction part
14 Control valve
16 Flow control pressure sensor
18 Temperature sensor
19 Control circuit
20 Inflow pressure sensor
22 Liquid filling on/off valve
23 Stop valve
30 Raw material vaporization supply apparatus
32 Vaporizing section
34 Flow path block
36 Preheating section
38 Buffer chamber
39 On/off valve
100 Gas supply system
P0 Supply pressure
P1 Upstream pressure

The invention claimed is:

1. An abnormality detection method for a flow rate control device provided in a gas supply system, the method comprising:
a step of providing the gas supply system including:
the flow rate control device including a restriction part, a control valve provided upstream of the restriction part, a flow control pressure sensor configured for measuring an upstream pressure between the restriction part and the control valve, and a control circuit configured to control the control valve based on an output of the flow control pressure sensor;
an inflow pressure sensor configured for measuring a supply pressure upstream of the control valve; and
an upstream on/off valve provided upstream of the inflow pressure sensor;
a step of closing the upstream on/off valve in a state where a gas flows downstream of the restriction part at a controlled flow rate by controlling an opening degree of the control valve based on the output of the flow control pressure sensor;
a step of measuring a drop in the supply pressure upstream of the control valve using the inflow pressure sensor, after closing the upstream on/off valve while keeping the control valve open; and
a step of diagnosing a condition of the flow rate control device based on a measured drop in the supply pressure.

2. The abnormality detection method according to claim 1, further comprising a step of opening the upstream on/off valve when the supply pressure is greater than the upstream pressure, after a measurement of the drop in the supply pressure after closing the upstream on/off valve is completed.

3. The abnormality detection method according to claim 2, wherein the step of measuring the drop in the supply pressure after closing the upstream on/off valve is repeated multiple times continuously or intermittently while keeping the control valve open to flow a gas downstream of the restriction part.

4. The abnormality detection method according to claim 1, wherein the step of diagnosing the condition of the flow rate control device comprises a step of detecting at least one of a clogging of the restriction part and an aperture expansion of the restriction part.

5. The abnormality detection method according to claim 1, wherein the control valve is feedback controlled based on the output of the flow control pressure sensor so that the upstream pressure between the restriction part and the control valve is maintained at a set value, and a feedback control of the control valve continues to flow gas downstream of the restriction part at a controlled flow rate during a period of measuring the drop in the supply pressure after closing the upstream on/off valve.

6. The abnormality detection method according to claim 1, wherein the control valve is feedback controlled based on the output of the flow control pressure sensor so that the upstream pressure between the restriction part and the control valve is maintained at a set value, but an opening degree of the control valve is maintained at a constant regardless of the output of the flow control pressure during a period of measuring the drop in the supply pressure after closing the upstream on/off valve, and the control valve is feedback controlled again after the period of measuring the drop in the supply pressure.

7. The abnormality detection method according to claim 1, wherein the gas supply system further includes a vaporizing section provided upstream of the inflow pressure sensor and configured to heat a liquid raw material to vaporize,
  the upstream on/off valve is a liquid filling on/off valve for controlling a supply of the liquid raw material to the vaporizing section, and
  with closing the upstream on/off valve after supplying the liquid raw material to the vaporizing section by temporarily opening the upstream on/off valve, the condition of the flow rate control device is diagnosed by measuring the drop in the supply pressure from an increased supply pressure due to the supply of the liquid raw material to the vaporizing section.

8. The abnormality detection method according to claim 1, wherein the gas supply system further includes a vaporizing section provided upstream of the upstream on/off valve and configured to heat a liquid raw material to vaporize, and
  a capacity expansion portion is provided between the upstream on/off valve and the inflow pressure sensor.

9. The abnormality detection method according to claim 1, wherein the inflow pressure sensor is incorporated in the flow rate control device.

10. The abnormality detection method according to claim 1, wherein the step of diagnosing the condition of the flow rate control device is performed by comparing pressure drop data corresponding to the measured drop in the supply pressure with a corresponding reference pressure drop data.

11. The abnormality detection method according to claim 10, wherein the pressure drop data is a time required for the supply pressure to drop from an initial pressure to a set pressure or a value of the supply pressure reached after a predetermined time has elapsed after closing the upstream on/off valve.

12. The abnormality detection method according to claim 10, wherein the pressure drop data is a slope $\alpha$ of an approximate line defined by $\ln(P0(t)/P0i)=-\alpha t$, where $P0(t)$ is a function of the supply pressure with respect to time, $P0i$ is an initial pressure of the supply pressure, and t is time.

13. The abnormality detection method according to claim 1, wherein the step of diagnosing the condition of the flow rate control device is performed by calculating a sum of differences between measured pressure values and reference pressure values for each sampling period.

14. A flow rate monitoring method comprising;
  a step of continuously detecting a presence or an absence of an abnormality of the flow rate control device according to the abnormality detection method of claim 1,
  a step of recognizing that a flow rate output from the flow rate control device is correct when no abnormality is detected in the flow rate control device, while recognizing that the flow rate output from the flow rate control device is incorrect when an abnormality is detected in the flow rate control device, thereby continuously monitoring the flow rate output from the flow rate control device.

15. The flow rate monitoring method according to claim 14, further comprising a step of modifying information indicating a relationship between the upstream pressure and the flow rate used for flow control in the flow rate control device if the flow rate output from the flow rate control device is recognized as an incorrect flow rate.

16. The flow rate monitoring method according to claim 15, further comprising a step of determining a difference ($\Delta t-\Delta tr$) between a drop time $\Delta t$ of the supply pressure at the time of measurement and a reference drop time $\Delta tr$, and a step of updating at least one of constant K1 and constant K2 in equations that $Q=K1 \cdot P1$ or $Q=K2 \cdot P2^{m}(P1-P2)^{n}$ based on the difference ($\Delta t-\Delta tr$), wherein the equations each represent a relationship between the upstream pressure and the flow rate, where Q is the flow rate, P1 is the upstream pressure, P2 is a downstream pressure of the restriction part, m and n are given exponents.

* * * * *